(12) United States Patent
Lou et al.

(10) Patent No.: US 10,090,974 B2
(45) Date of Patent: *Oct. 2, 2018

(54) MIMO BASED ADAPTIVE BEAMFORMING OVER OFDMA ARCHITECTURE

(71) Applicant: AT&T Intellectual Property I, L.P., Atlanta, GA (US)

(72) Inventors: Yuang Lou, Dunwoody, GA (US); Douglas A. Duet, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,539

(22) Filed: Jun. 13, 2017

(65) Prior Publication Data

US 2017/0279572 A1    Sep. 28, 2017

Related U.S. Application Data

(63) Continuation of application No. 14/528,363, filed on Oct. 30, 2014, now Pat. No. 9,716,572.

(51) Int. Cl.
*H04W 72/00* (2009.01)
*H04L 5/00* (2006.01)
(Continued)

(52) U.S. Cl.
CPC ......... *H04L 5/0023* (2013.01); *H04B 7/0452* (2013.01); *H04B 7/0617* (2013.01);
(Continued)

(58) Field of Classification Search
CPC ..... H04L 5/0023; H04L 5/0053; H04L 27/36; H04B 7/0617; H04B 7/0452; H04B 7/0632
See application file for complete search history.

(56) References Cited

U.S. PATENT DOCUMENTS 7,529,311 B2    5/2009    Shen et al.
7,570,696 B2    8/2009    Maltsev et al.
(Continued)

OTHER PUBLICATIONS

Andrews, J., et al., "Overcoming Interference in Spatial Multiplexing MIMO Cellular Networks," IEEE Wireless Communications, Dec. 2007, pp. 95-104.
(Continued)

*Primary Examiner* — Phuc Tran
(74) *Attorney, Agent, or Firm* — Zagorin Cave LLP

(57) ABSTRACT

A wireless communications system combines Multiple Input/Multiple Output (MIMO), beamforming, and Orthogonal Frequency Division Multiple Access (OFDMA) techniques to increase spectral efficiency. A method includes transmitting first data in a first beam of electromagnetic signals focused on a first user equipment and generated by a first antenna array. The first data is associated with the first user equipment. The first data is transmitted using a first OFDMA resource block of a time slot of a radio frame and first beamforming weights. The method includes transmitting second data in a second beam of electromagnetic signals focused on a second user equipment and generated by the first antenna array. The second user equipment is spatially diverse from the first user equipment. The second data is associated with the second user equipment. The second data is transmitted using the first OFDMA resource block of the time slot and second beamforming weights.

19 Claims, 6 Drawing Sheets

(51) Int. Cl.
*H04B 7/0452* (2017.01)
*H04B 7/06* (2006.01)
*H04L 27/36* (2006.01)

(52) U.S. Cl.
CPC .......... *H04B 7/0632* (2013.01); *H04L 5/0053* (2013.01); *H04L 27/36* (2013.01)

(56) References Cited

U.S. PATENT DOCUMENTS

| | | | |
|---|---|---|---|
| 7,609,780 | B2 | 10/2009 | Sadowsky |
| 7,620,370 | B2 | 11/2009 | Barak et al. |
| 7,751,493 | B2 | 7/2010 | Niu et al. |
| 7,876,715 | B1 | 1/2011 | Jin et al. |
| 8,005,131 | B2 | 8/2011 | Li et al. |
| 8,040,970 | B2 | 10/2011 | Pare, Jr. |
| 8,098,755 | B2 | 1/2012 | Kim et al. |
| 8,134,503 | B2 | 3/2012 | Na et al. |
| 8,150,399 | B2 * | 4/2012 | Wong ................. H04L 41/5009 370/310.2 |
| 8,190,165 | B2 * | 5/2012 | Hosein ................. H04W 72/04 370/311 |
| 8,204,145 | B2 | 6/2012 | Sadowsky |
| 8,229,506 | B2 | 7/2012 | Duet et al. |
| 8,243,678 | B2 * | 8/2012 | Cudak ................. H04L 5/0007 370/330 |
| 8,254,486 | B2 | 8/2012 | Shi et al. |
| 8,576,804 | B2 | 11/2013 | Kim et al. |
| 8,654,877 | B2 | 2/2014 | Tong et al. |
| 8,704,726 | B2 | 4/2014 | Nogami |
| 8,842,763 | B2 * | 9/2014 | Taoka ................. H04B 7/0452 375/259 |
| 2008/0267056 | A1 | 10/2008 | Aryanfar et al. |
| 2009/0041148 | A1 * | 2/2009 | Li ........................ H04L 1/0017 375/267 |
| 2009/0128410 | A1 | 5/2009 | Li |
| 2010/0020702 | A1 * | 1/2010 | Wong ................. H04L 41/5009 370/252 |
| 2010/0130133 | A1 | 5/2010 | Lou et al. |
| 2010/0295730 | A1 | 11/2010 | Jeon |
| 2011/0013603 | A1 | 1/2011 | Li et al. |
| 2011/0130160 | A1 * | 6/2011 | Miyata ................ H04W 72/046 455/501 |
| 2011/0211595 | A1 * | 9/2011 | Geirhofer ............. H04B 7/155 370/478 |
| 2012/0188900 | A1 | 7/2012 | Li et al. |
| 2012/0281781 | A1 | 11/2012 | Xiao et al. |
| 2012/0314808 | A1 * | 12/2012 | Taoka ................. H04B 7/0452 375/299 |
| 2012/0321017 | A1 | 12/2012 | Lee et al. |
| 2013/0244594 | A1 | 9/2013 | Alrabadi et al. |
| 2013/0322574 | A1 | 12/2013 | Chen et al. |
| 2014/0064396 | A1 | 3/2014 | Van Zelst et al. |
| 2014/0192915 | A1 | 7/2014 | Mundarath et al. |
| 2015/0124688 | A1 * | 5/2015 | Xu ....................... H04B 7/0452 370/312 |
| 2015/0244433 | A1 * | 8/2015 | Jindal ................. H04B 7/0413 370/329 |
| 2016/0135060 | A1 * | 5/2016 | Branlund ............. H04W 16/28 370/280 |

OTHER PUBLICATIONS

Gesbert, D., et al., "Multi-Cell MIMO Cooperative Networks: A New Look at Interference," IEEE Journal on Selected Areas in Communications, vol. 28, No. 9, Dec. 2010, pp. 1-29.

Gomez, Gerardo, et al., "A Next Generation Wireless Simulator Based on MIMO-OFDM: LTE Case Study," EURASIP Journal on Wireless Communications and Networking, vol. 2010, Article ID 161642, Feb. 3, 2010, 14 pages.

Gosh, Arunabha et al., "Fundamentals of LTE," Pearsons Education, Inc. 2011, 6 pages.

Li, Q., et al., "MIMO Techniques in WiMAX and LTE: A Feature Overview," IEEE Communications Magazine, May 2010, pp. 86-92.

Park, C., et al., "Evolution of Uplink MIMO for LTE-Advanced," IEEE Communications Magazine, Feb. 2011, pp. 112-121.

Petermann, M., et al., "On Allocation Strategies for Dynamic MIMO-OFDMA with Multi-User Beamforming," 12th International OFDM-Workshop 2007 (InOWo 07) Hamburg, Germany, Aug. 29-30, 2007, 5 pages.

* cited by examiner

MIMO BASED ADAPTIVE BEAMFORMING OVER OFDMA ARCHITECTURE

CROSS REFERENCE TO RELATED APPLICATIONS

This application is a continuation of U.S. patent application Ser. No. 14/528,363, entitled "MIMO Based Adaptive Beamforming Over OFDMA Architecture," filed Oct. 30, 2014, which application is incorporated herein by reference.

BACKGROUND

Field of the Disclosure

The present disclosure relates to communications technology and more particularly to wireless communications services using digital modulation techniques.

Description of the Related Art

A typical wireless communications network uses digital modulation techniques (e.g., Quadrature Amplitude Modulation (QAM)) to increase the spectral efficiency (bps/Hz) of wireless communications. To increase the amount of data being communicated via QAM, the number of distinct amplitude levels used by the communication may be increased. However, to reduce or avoid degrading the communication reliability, an increase in the number of distinct amplitude levels must be accompanied by sufficient channel capacity, which may be quantified by a Signal-to-Interference-plus-Noise-Ratio (SINR) for a particular communications distance. In addition, the increase in the number of distinct amplitude levels increases the required transmit signal power. However, in a typical wireless communications system, the transmit signal power is limited by regulation. Thus, any increases in the number of distinct amplitude levels must be accompanied by shorter communications distances to maintain communications with an increased SINR. A reduction in radio communications distance may result in increased network costs due to an increase in the number of base stations and a decrease in cell size. Accordingly, improved techniques for increasing the spectral efficiency of a wireless communications system are desired.

SUMMARY OF EMBODIMENTS OF THE DISCLOSURE

In at least one embodiment, a method of operating a wireless communications system includes transmitting first data in a first beam of electromagnetic signals focused on a first user equipment and generated by a first antenna array. The first data is associated with the first user equipment. The first data is transmitted using a first orthogonal frequency division multiple access (OFDMA) resource block of a time slot of a radio frame and first beamforming weights. The method includes transmitting second data in a second beam of electromagnetic signals focused on a second user equipment and generated by the first antenna array. The second user equipment is spatially diverse from the first user equipment. The second data is associated with the second user equipment. The second data is transmitted using the first OFDMA resource block of the time slot of the radio frame and second beamforming weights. The first OFDMA resource block may include a plurality of resource elements. Each resource element may be defined by a frequency subcarrier of a first frequency band and a symbol index of a time slot of the radio frame.

In at least one embodiment, an apparatus includes a precoder configured to generate a first signal based on first beamforming weights and first data associated with a first user equipment. The precoder is configured to generate a second signal based on second beamforming weights and second data associated with a second user equipment. The second user equipment is spatially diverse from the first user equipment. The apparatus includes a resource mapper configured to map the first signal to an OFDMA resource block of a time slot of a radio frame. The resource mapper is configured to map the second signal to the first OFDMA resource block of the time slot of the radio frame. The apparatus includes a transmitter configured to transmit the first signal in a first beam of electromagnetic signals using a first antenna array and first beamforming weights. The transmitter is configured to transmit the second signal in a second beam of electromagnetic signals using the first antenna array and second beamforming weights.

In at least one embodiment, a non-transitory, computer-readable storage medium storing instructions executable on a processor to cause the processor to generate a first signal based on first beamforming weights and first data associated with a first user equipment. The computer-readable storage medium stores instructions executable on the processor to cause the processor to generate a second signal based on second beamforming weights and second data associated with a second user equipment, the second user equipment being spatially diverse from the first user equipment. The computer-readable storage medium stores instructions executable on the processor to cause the processor to map the first signal to a first orthogonal frequency division multiple access (OFDMA) resource block of a time slot of a radio frame and configured to map the second signal to the first OFDMA resource block of the time slot of the radio frame. The computer-readable storage medium may store instructions executable on the processor to cause the processor to generate the first beamforming weights and the second beamforming weights based on a first Signal-to-Interference-plus-Noise-Ratio (SINR) indicator received from the first user equipment and a second SINR indicator received from the second user equipment.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
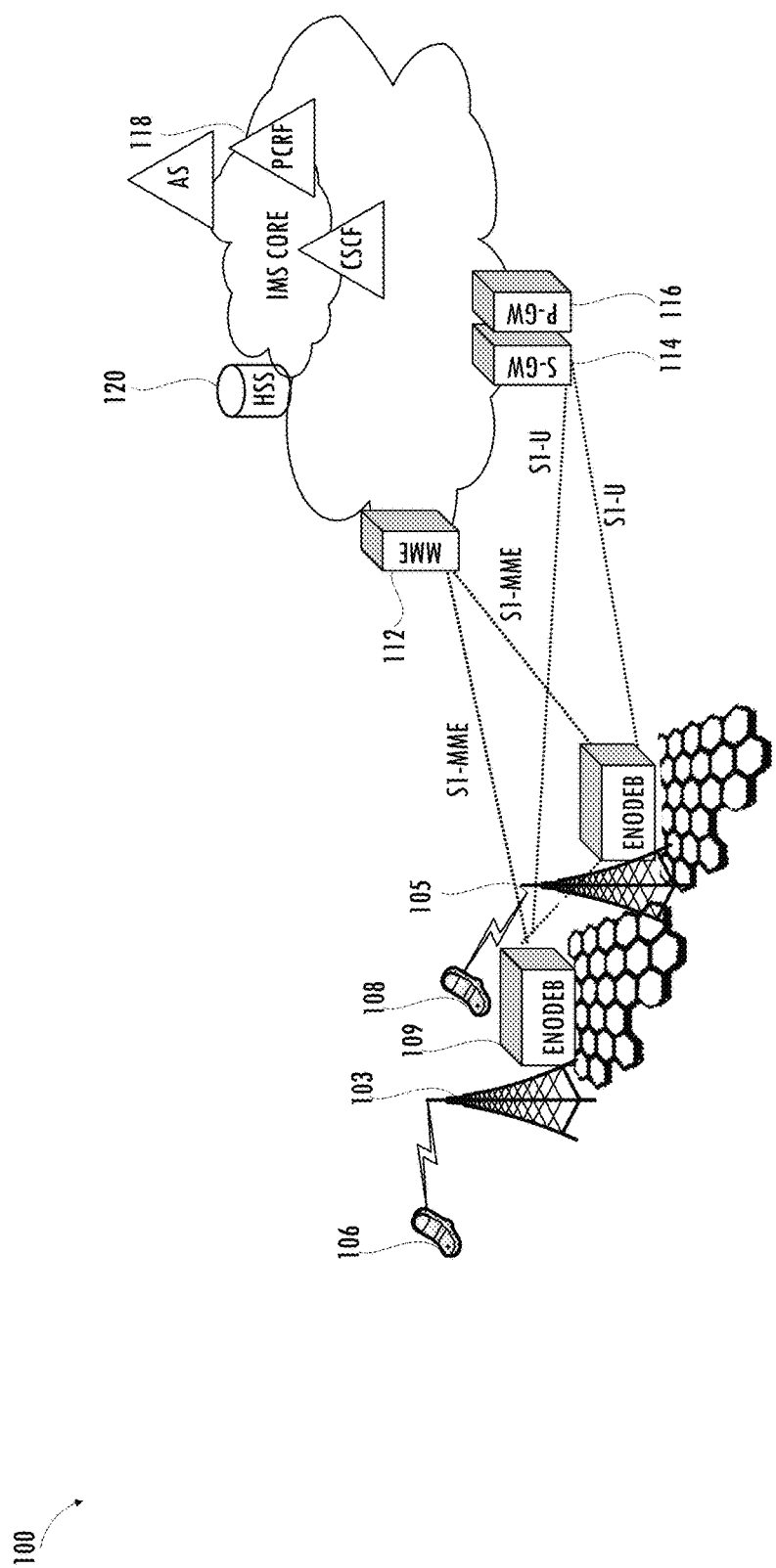
FIG. 1 illustrates an exemplary wireless communications network.

A technique for improving the spectral efficiency of a wireless communications network is disclosed. The technique combines Multiple Input/Multiple Output (MIMO) and beamforming techniques to facilitate increasing the number of distinct amplitude levels used by a digital modulation technique (e.g., by Quadrature Amplitude Modulation (QAM)). In general, MIMO techniques use multiple radio transmitters and multiple elements in an antenna array to improve performance of wireless communications. The beamforming technique may increase distance of communication or increase the number of distinct amplitude levels used by the digital modulation technique. MIMO uses space-division multiplexing with spatially separated transmit and receive antenna elements. In general, increasing the number of diverse antenna elements used and increasing the number of amplitude levels used for QAM to increase the spectral efficiency requires an increase in SINR, which results in shorter distance coverage for a given total signal power.

In addition, in a typical MIMO system, all antenna elements transmit electromagnetic signal power over an entire service area (e.g., cell or sector), which wastes a substantial amount of the transmitted power. That wasted power may be electromagnetic interference to neighboring receivers and also may raise the noise level in the electromagnetic environment. As a result, increasing the number of antenna elements in MIMO operation and increasing the number of amplitude levels of a digital modulation scheme increases spectral efficiency (e.g., measured in bits per second per Hertz (bps/Hz (spectral efficiency) at the expense of a reduced service area, thus reducing or eliminating any benefit obtained from increasing the MIMO operation by increasing the number of amplitude levels of the digital modulation technique.

In general, beamforming technology improves the performance of the wireless communications network differently than MIMO. Beamforming alters the phase of each element in an antenna array to create spatial beam patterns through constructive and destructive interference. Beamforming focuses the power of the transmitted electromagnetic waves into a narrower beam in the direction of the receiver instead of transmitting in all directions (i.e., 360 degrees). Since the electromagnetic waves are focused on the receiver, beamforming transmission increases the system SINR, thus allowing the system to support increased numbers of distinct amplitude levels of the digital QAM modulation without sacrificing the communication range. Adaptive beamforming, which tracks users within the cell, is an effective way to support wireless communications.

In at least one embodiment of communications system, orthogonal coding, is combined with MIMO-based adaptive beamforming implementation using an OFDMA technique to increase spectral efficiency without reducing range of service for a particular transmit power and SINR. In contrast to a typical multi-user MIMO (MU-MIMO) system, adaptive beamforming is used to serve a plurality of user sessions associated with corresponding user equipment receiving directions over a set of dynamically combined resource blocks of the transmitted signal. The technique increases the spectral efficiency using spatial diversity of beamforming in combination with orthogonal coding, while increasing user access via OFDMA. The technique supports multi-user access and increases spectral efficiency without loss of coverage area. In addition, the technique reduces electromagnetic interference to neighboring cells.

Referring to FIG. 1, wireless communications network 100 includes an evolved packet core network including mobility management entity 112, serving gateway 114, packet data network gateway 116, and policy and charging rules function (PCRF) 118. Mobility management entity 112 performs signaling and control functions to manage access to network connections by user equipment 106 and user equipment 108, assignment of resources to user equipment 106 and user equipment 108, and mobility management functions, e.g., idle mode location tracking, paging, roaming, and handovers. Mobility management entity 112 controls control plane functions related to subscriber and session management for service to user equipment 106 and user equipment 108. In addition, mobility management entity 112 provides security operations including providing temporary identities for user equipment, interacting with home subscriber server 120 for authentication, and negotiation of ciphering and integrity protection algorithms. User equipment 106 and user equipment 108 each may be any wireless device directly used by an end-user to communicate (e.g., hand-held telephone, smartphone, laptop computer, tablet, wearable device, or other device configured with wireless communications equipment including a wireless transmitter and a wireless receiver). As referred to herein, a session is an active communication of data over a network between two devices and may include a first data stream from a first device to the second device and a second data stream from the second device to the first device. It may be possible to have more than one session between two devices simultaneously.

Mobility management entity 112 selects suitable serving and Packet Data Network (PDN) gateways, and selects legacy gateways for handover to other networks. Mobility management entity 112 may manage a plurality (e.g., thousands) of base stations (e.g., enhanced Node-B (eNode-B) elements) or evolved packet data gateway elements. Serving gateway 114 manages user plane mobility. Serving gateway 114 routes and forwards user data packets. Serving gateway 114 also behaves as a mobility anchor during inter-eNode-B handovers and as the anchor for mobility between Long Term Evolution (LTE) and other 3GPP wireless technologies. Packet data network gateway 116 provides connectivity from user equipment 106 and user equipment 108 to external packet data networks by being the point of exit and entry of traffic for the user equipment. Policy and charging rules function 118 interfaces with packet data network gateway 116 and supports service data flow detection, policy enforcement, and flow-based charging. Home subscriber server 120 is a central database that stores user-related and subscription-related information. Home subscriber server 120 provides mobility management, call and session establishment support, user authentication, and access authorization.

Figure 2:
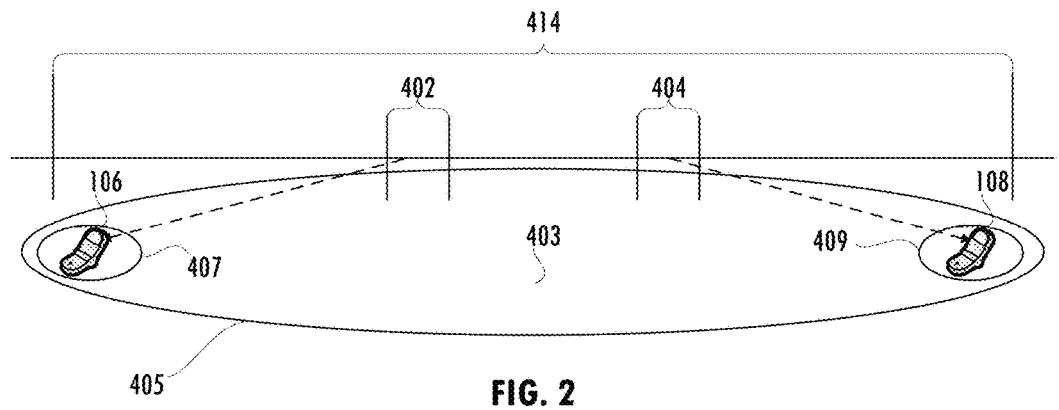
FIG. 2 illustrates an exemplary spectrum configuration for wireless communications.

Referring to FIGS. 1 and 2, in an exemplary implementation of wireless communications system 100, base station 109 (which may include e.g., a Long Term Evolution eNode-B) assigns different resource blocks to different users. For example, resource block 402 is allocated to user equipment 106 and resource block 404 is allocated to user equipment 108. Those electromagnetic signals are not focused on the dedicated receiver (e.g., the electromagnetic signals are transmitted in all directions, e.g., power 405 of FIG. 2, and only power 407 and power 409 are received at user equipment) resulting in wasted power 403.

Figure 3:
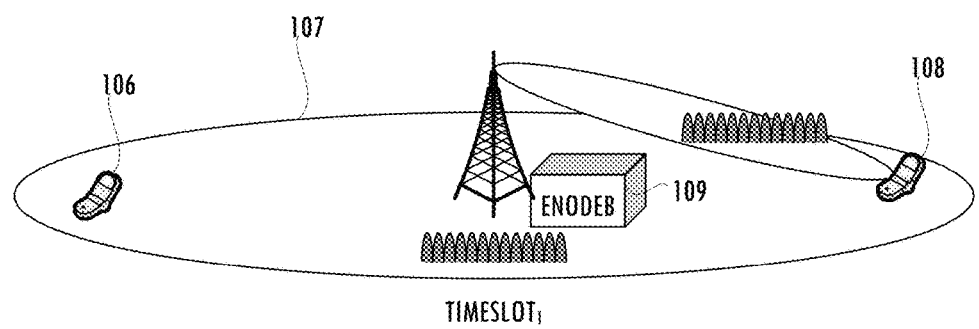
FIG. 3 illustrates an exemplary time division multiple access configuration for wireless communications.
Figure 4:
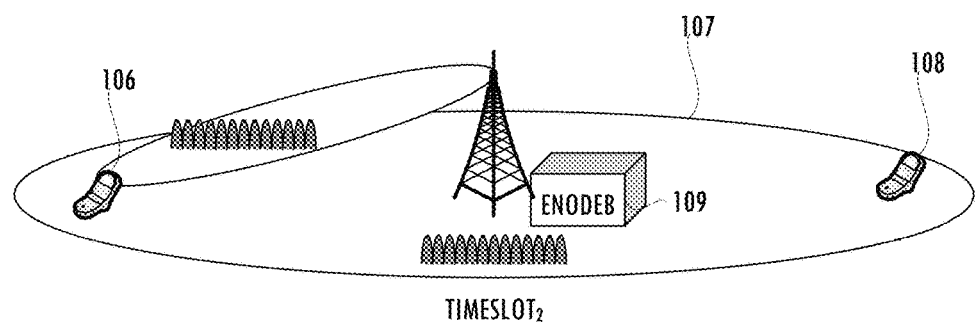
FIG. 4 illustrates an exemplary time division multiple access configuration for wireless communications.

Referring to FIGS. 3 and 4, MIMO is implemented in a Multi-User-MIMO (MU-MIMO) system by implementing time division multiple access of all resource blocks of an OFDM system. However, that configuration of communications system 100 can support only one user at a time. For example, during timeslot$_1$, user equipment 106 does not receive service. All resource blocks of the OFDM system are dedicated to providing service to user equipment 108 and all of the transmit power is dedicated to providing electromagnetic signals that includes those OFDM resource blocks to user equipment 108. During timeslot$_2$, user equipment 108 does not receive service. All resource blocks of the OFDM system are dedicated to providing service to user equipment 106 and all of the transmit power is dedicated to providing electromagnetic signals that include those OFDM resource blocks to user equipment 106.

Figure 5:
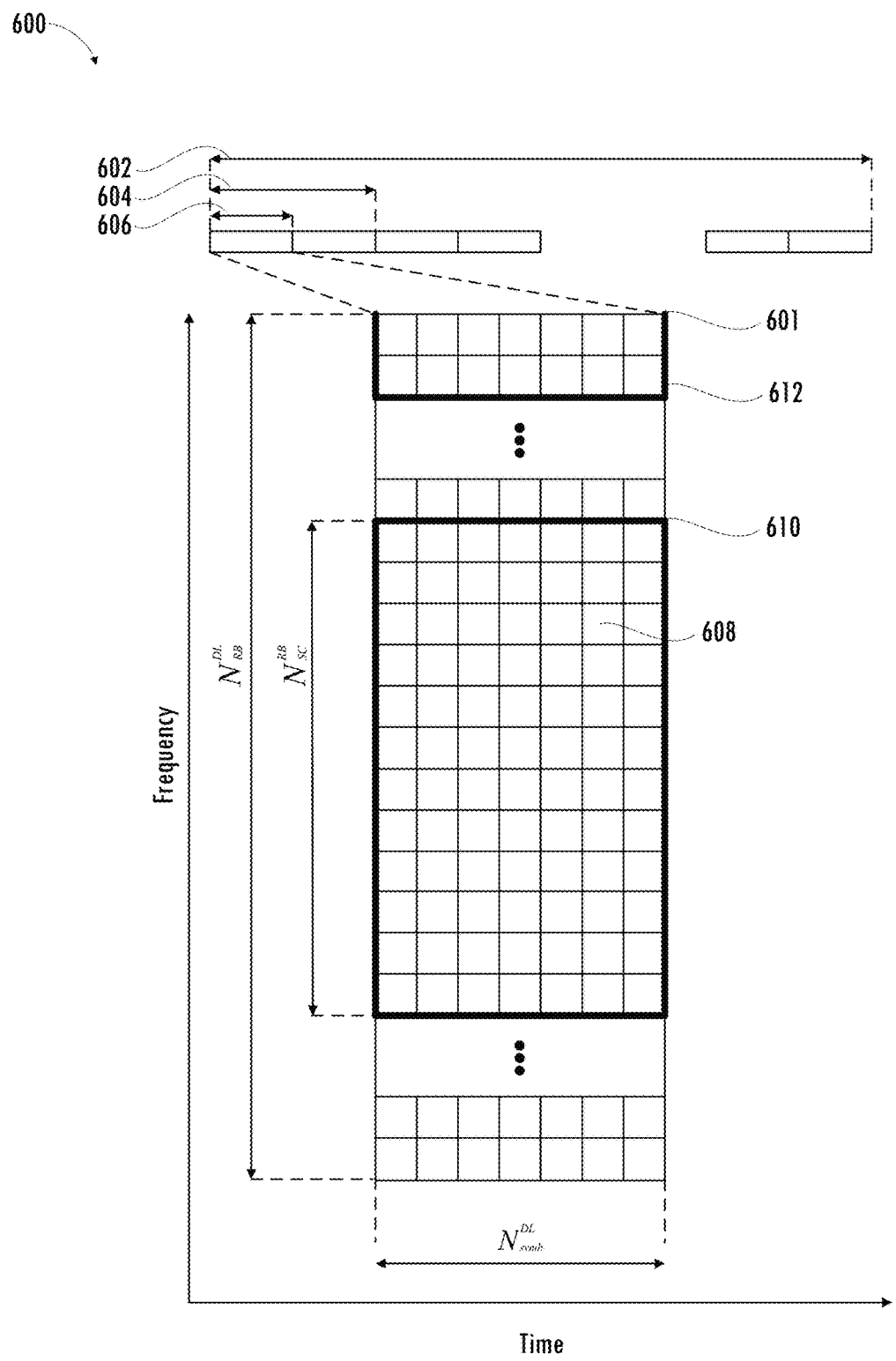
FIG. 5 illustrates frequency and time resource allocation for a MIMO-based adaptive beamforming orthogonal frequency division multiple access (OFDMA) communications consistent with at least one embodiment of the disclosure.

Referring to FIG. 5, exemplary downlink OFDMA physical resource allocation 600 includes resource grid 601. Radio frame 602, includes multiple subframes 604 (e.g., two time slots). Each time slot 606 includes $NB_{RB}^{DL}$ downlink resource blocks, which may vary with a specified bandwidth of a particular embodiment of a communications system. The exemplary downlink OFDMA physical resource allocation includes $N_{SC}^{RB}$ subcarriers in each resource block, and $N_{symb}^{DL}$ downlink OFDM symbols in each resource block. The number of subcarriers varies based on the width of each resource block (e.g., 180 kHz) and the subcarrier spacing, $\Delta f$, of a particular embodiment of a communications system (e.g., $\Delta f$=15 kHz, 15 kHz, or 7.5 kHz, $N_{SC}^{RB}$=12, 12, or 24, respectively, and $N_{symb}^{RB}$=7, 6, or 3, respectively, depending on whether a normal or extended cyclic prefix is used). Each downlink resource block 610 includes $N_{SC}^{RB} \times N_{symb}^{DL}$ resource elements and the downlink resource grid includes $N_{RB}^{DL} \times N_{symb}^{DL}$ resource elements. Each resource element (e.g., resource element 608) has an associated frequency subcarrier and a symbol index of a time slot of a radio frame. In at least one embodiment of the dynamic wireless OFDMA-based beamforming system, each antenna of the system has an associated resource grid 600 and the minimum radio resource that may be allocated is the minimum transmission time interval (TTI) in the time domain, which, in some embodiments of the dynamic wireless OFDMA-based beamforming system, is one subframe 604, corresponding to two resource blocks. Available downlink resource blocks may be allocated to different users. The downlink resource blocks that are allocated to a particular user are communicated by the eNode-B in control information to the user equipment over a control channel or by other suitable technique.

Figure 6:
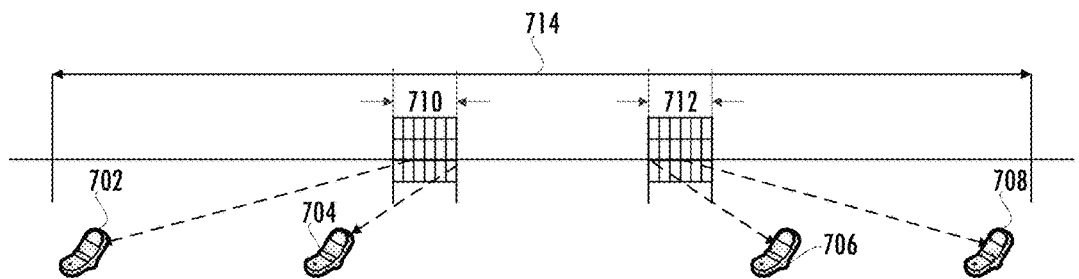
FIG. 6 illustrates an exemplary spectrum configuration for exemplary MIMO-based adaptive beamforming OFDMA configurations for wireless communications consistent with at least one embodiment of the disclosure.

Referring to FIG. 6, in at least one embodiment of a wireless communication system, multiple antenna elements of an antenna array are configured to transmit signals using a MIMO-based adaptive beamforming OFDMA technique. A plurality of elements of the antenna array are associated with a particular frequency band of the electromagnetic spectrum and are configured for communication with a first set of users. The same plurality of antenna elements of the antenna array are configured for communication with a second set of users in a different frequency band. For example, a first set of antenna elements of a phased antenna array is configured for adaptive beamforming communication with user equipment 702 and user equipment 704 using first portion of the electromagnetic spectrum 714, e.g., first OFDMA resource blocks of frequency band 710. A second set of antenna elements of the phased antenna array is also configured for adaptive beamforming communication with user equipment 706 and 708 using a second portion of electromagnetic spectrum 714, e.g., second OFDMA resource blocks of frequency band 712. In at least one embodiment of the wireless communications system, the second set of antenna elements of the antenna array may be used for MIMO without adaptive beamforming.

Figure 7:
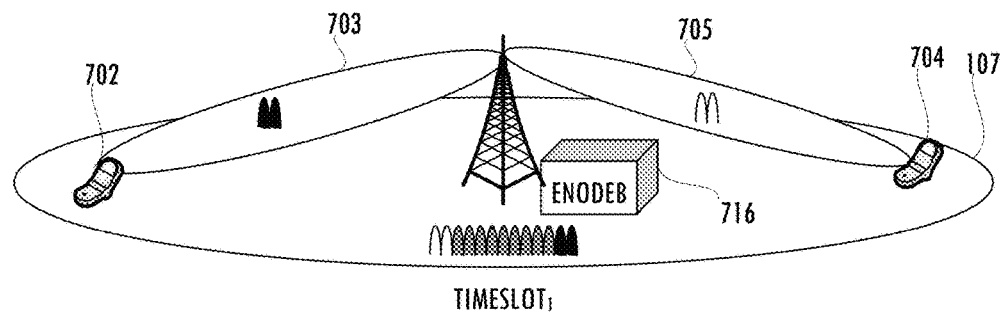
FIG. 7 illustrates an exemplary MIMO-based adaptive beamforming OFDMA configuration for wireless communications consistent with at least one embodiment of the disclosure.
Figure 8:
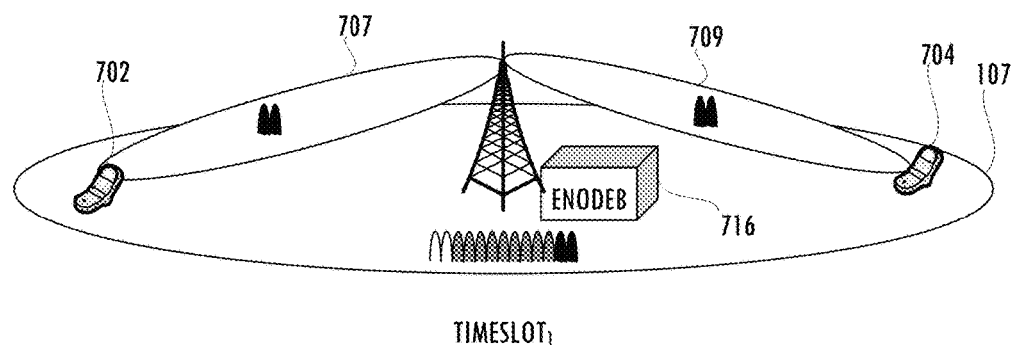
FIG. 8 illustrates an exemplary MIMO-based adaptive beamforming OFDMA configuration for wireless communications consistent with at least one embodiment of the disclosure.

Referring to FIGS. 7 and 8, antenna elements from the same array may be configured for adaptive beamforming to communicate with corresponding user equipment using the associated OFDMA resource blocks. Referring to FIG. 7, in at least one embodiment of the wireless communications system, eNode-B 716 communicates data to each user via a distinct focused beam of unique resource blocks. For example, user equipment 702 receives first user data from eNode-B 716 using beam 703 focused on user equipment 702. Beam 703 includes first OFDMA resource blocks of frequency band 710. User equipment 704 receives second user data from eNode-B 716 using beam 705 focused on user equipment 704. Beam 705 includes second OFDMA resource blocks of frequency band 710.

However, since beams 703 and 705 are being focused on separate user equipment in separate locations, beams 703 and 705 may not substantially interfere with one another at the receivers of user equipment 702 and 704 and unique resource blocks may not be required for transmission of corresponding data. Accordingly, in at least one embodiment of a wireless communications system, resource blocks do not need to be unique to communicate with spatially diverse user equipment, i.e., user equipment in locations out of range of a beam focused on other user equipment. A scheduler may assign the same resource blocks in different beams to different user equipment. Referring to FIG. 8, in at least one embodiment of the wireless communications system, eNode-B 716 communicates data to each user equipment via a distinct focused beam, but reuses resource blocks. For example, user equipment 702 receives first user data from eNode-B 716 using beam 707 focused on user equipment 702. Beam 707 includes first user data in first OFDMA resource blocks of frequency band 710. User equipment 704 receives second user data from eNode-B 716 using beam 709 focused on user equipment 704. Beam 709 includes second user data in the first OFDMA resource blocks of frequency band 710.

Figure 9:
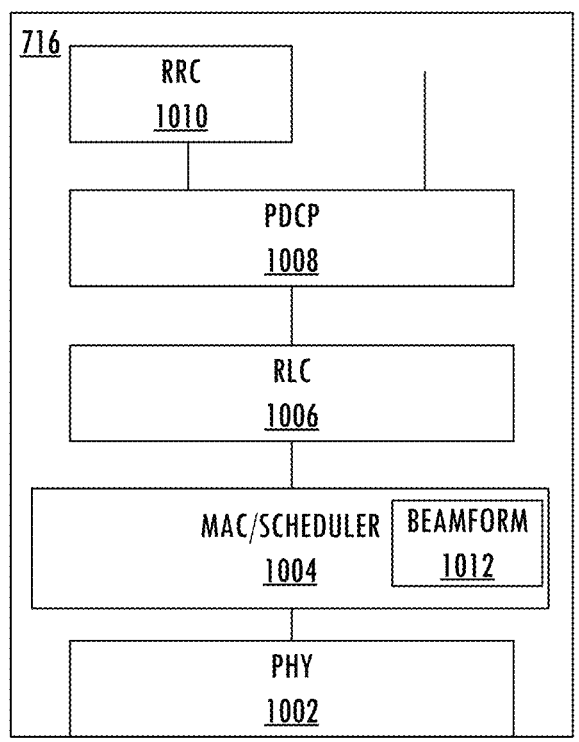
FIG. 9 illustrates a functional block diagram of an exemplary base station for exemplary MIMO-based adaptive beamforming OFDMA communications consistent with at least one embodiment of the disclosure.

Referring to FIG. 9, an exemplary base station (e.g., eNode-B 716) includes Radio Resource Control module 1010, Packet Data Convergence Protocol module 1008, Radio Link Control module 1006, Medium Access Control module (MAC) and scheduler 1004, which includes a base station scheduler that dynamically allocates and deallocates resource blocks to particular users in a cell, and PHYsical layer module (PHY) 1002. MAC and scheduler 1004 organizes data into transport blocks and schedules data for transmission to PHY 1002, which then formats the transport blocks into signals for transmission over the air. In at least one embodiment, MAC and scheduler 1004 includes beamformer 1012, which generates beamforming weights that are supplied to the PHYsical layer module 1002 for combination with data for transmission using multiple antennas.

The base station uses multiple antenna arrays to transmit the same signal appropriately weighted for each antenna element such that the effect is to focus the transmitted beam in the direction of the target receiver of the user equipment and away from interference, thereby improving the received signal-to-interference ratio. The user equipment is not aware of the total number of physical antenna elements being used by eNode-B 716 for the adaptive beamforming. The base station, using beamforming weights, combines into a single transmission, the signals generated by multiple physical antenna elements. In at least one embodiment of adaptive beamformer 1012, beamforming weights are selected to result in beam patterns that may be dynamically adjusted to attenuate undesired signals while amplifying desired signals. At the user equipment, incoming signals to the receiver typically consist of desired energy and interference energy (e.g., from other users or multipath reflection). An exemplary receiver characterizes each received signal in terms of the direction of arrival (DOA) or angle of arrival (AOA). The user equipment may communicate related information to eNode-B 716 for use by adaptive beamformer 1012. For example, user equipment communicates a channel quality indicator to eNode-B 716. The channel quality indicator may contain information indicating a suitable downlink transmission data rate, e.g., a modulation and coding scheme value based on SINR at the user equipment, or other suitable information.

Adaptive beamformer 1012 may estimate the direction and distance of the target mobile receiver using any suitable signal processing techniques (e.g., Multiple Signal Classification (MUSIC) beamforming technique, Estimation of Signal Parameters via Rotational Invariance Techniques (ESPRIT), or Maximum Likelihood (ML) beamforming technique). The beamformer may extract a weighting vector for the antenna elements from these acquired directions of the target mobile receiver, and uses it to transmit or receive the desired signal of a specific user while suppressing undesired interference signals. Any suitable algorithm for determining beamforming weights may be used.

Figure 10:
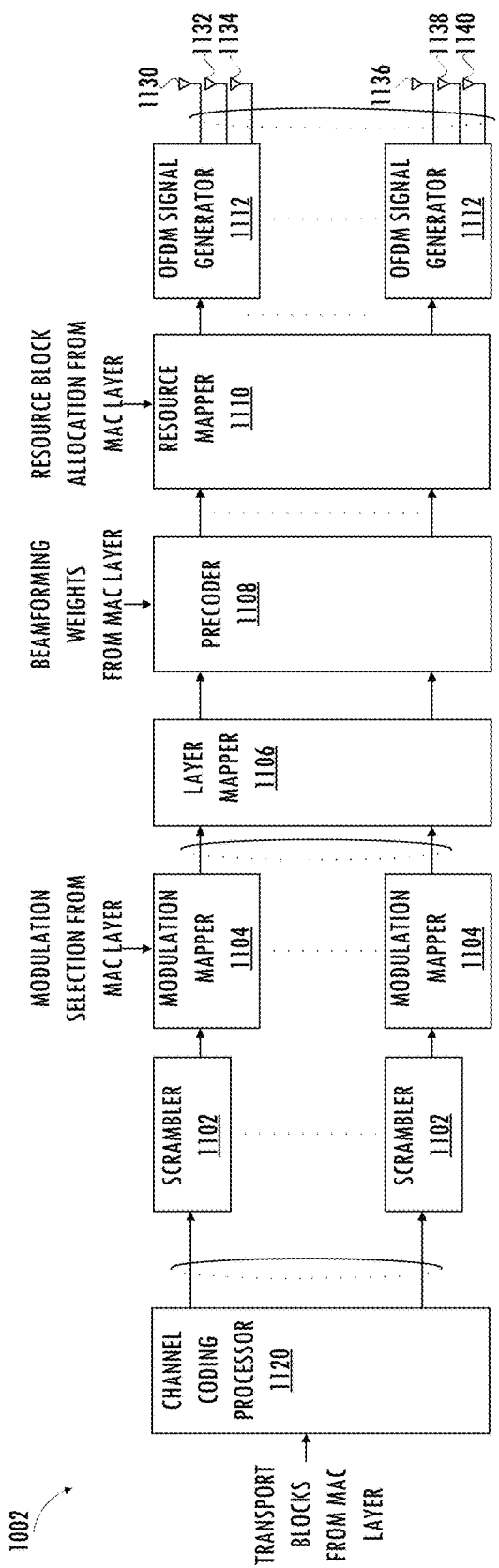
FIG. 10 illustrates a functional block diagram of an exemplary physical interface of an exemplary base station transmitter consistent with at least one embodiment of the disclosure.

Referring to FIG. 10, an exemplary PHY 1002 of FIG. 9, includes a transmitter path including channel coding processor 1120, scrambler(s) 1102, modulation mappers 1104, layer mappers 1106, precoder 1108, resource mappers 1110, and OFDMA signal generators 1112, which generate radio frequency signals for transmission by one or more of antennas 1130, 1132, . . . , 1140. For each codeword q provided by scrambler 1102, modulation mapper 1104 modulates a block of scrambled bits $\tilde{b}^{(q)}(0), \ldots, \tilde{b}^{(q)}(M_b^{(q)}-1)$ into a block of complex-valued modulation symbols $d^{(q)}(0), \ldots, d^{(q)}(M_s^{(q)}-1)$, where $M_s^{(q)}$ is a number of modulation symbols in each codeword and depends on the modulation scheme. The relation between $M_s^{(q)}$ and $M_b^{(q)}$ is as follows:

$$M_s^{(q)} = \frac{M_b^{(q)}}{Q_m},$$

where $Q_m$ is the number of bits in the modulation constellation, with $Q_m=2$ for QPSK, $Q_m=4$ for 16 QAM, and $Q_m=6$ for 64 QAM. Other suitable modulation schemes may be used. As $Q_m$ increases, the number of distinct amplitude levels increases. The particular modulation scheme implemented is determined by the MAC layer according to the SINR achievable while not exceeding a predetermined transmitter power and not falling below a predetermined SINR level, using the MIMO-based adaptive beamforming OFDMA techniques described herein.

In at least one embodiment of the communications system, antenna elements 1130, 1132, . . . , 1140 are elements of a phased antenna array, e.g., a group of multiple active antenna elements coupled to a common source or load to produce a directive radiation pattern. A typical active antenna element is an element whose energy output is modified due to the presence of a source of energy in the element other than the mere signal energy which passes through the circuit or an element in which the energy output from a source of energy is controlled by the signal input. Referring to FIGS. 6 and 10, in at least one embodiment of a communications system, a subset of antenna elements 1130, 1132, . . . , 1140 is used for communications over frequency band 710 and another mutually exclusive subset of antenna elements 1130, 1132, . . . , 1140 is used for communications over frequency band 712. Although six antenna elements are illustrated, any suitable number of antennas may be used.

Referring back to FIGS. 7, 8, 9, and 10, adaptive beamformer 1012 of MAC and scheduler 1004 determines beamforming weights, as described above. In addition, MAC and scheduler 1004 determines the modulation scheme, allocates resource blocks to individual users, and communicates the modulation scheme and allocation to modulation mapper 1104 and resource mapper 1110, respectively, of PHY 1002. MAC and scheduler 1004 may allocate resource blocks based on user throughput demands. Each subcarrier of the resource block may be assigned a modulation level based on the SNIR of the path between the antenna and the user. In general, increased modulation levels and increased numbers of subcarriers allocated to the user increase throughput to the user. In at least one embodiment, MAC and scheduler 1004 allocates antenna elements 1130, 1132, and 1134, to user equipment 702 and 704 and allocates antenna elements 1136, 1138, and 1140 to user equipment 706 and 708. MAC and scheduler 1004 may allocate user equipment 702 and user equipment 704 the same OFDMA resource blocks or different OFDMA resource blocks. MAC and scheduler 1004 may allocate user equipment 706 and user equipment 708 the same OFDMA resource blocks or different OFDMA resource blocks. MAC and scheduler 1004 may use beamforming weights that focus respective beams on the corresponding user equipment. MAC and scheduler 1004 determines the resource block allocation and selects a modulation scheme for each of the user equipment based on SINR information received from each of user equipment 702, 704, 706, and 708. In at least one embodiment, MAC and scheduler 1004 selects the modulation scheme from a predetermined set of modulation schemes supported by the system, allocates OFDMA resource blocks, and determines associated beamforming weights that communicate the greatest number of bits over a predetermined communications distance with an SINR that does not fall below a predetermined SINR and a transmit power that does not exceed a predetermined transmit power for the eNode-B.

Figure 11:
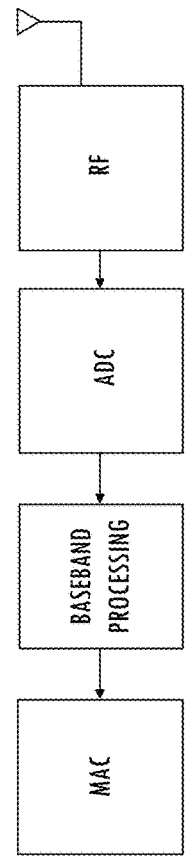
FIG. 11 illustrates a functional block diagram of an exemplary physical interface of user equipment receiver consistent with at least one embodiment of the disclosure.

Precoder 1108 applies beamforming weights received from the MAC layer. The relative phases of the respective signals feeding the antenna elements are varied in such a way that the effective radiation pattern of the array is reinforced in a desired direction and suppressed in undesired directions. In general, the spatial relationship of the individual antennas also contributes to the directivity of the antenna array. FIG. 11 illustrates exemplary user equipment receiver path for receiving and recovering data from the electromagnetic signal received from eNode-B 716.

Thus, a wireless communications system that combines MIMO, adaptive beamforming using OFDMA configurations to facilitate increasing spectral efficiency of the communications system has been disclosed. Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

The description of the disclosure set forth herein is illustrative, and is not intended to limit the scope of the disclosure as set forth in the following claims. For example, while the disclosure has been described in an embodiment in which a particular wireless network configuration and protocol is described, one of skill in the art will appreciate that the teachings herein can be utilized with other network configurations and communications protocol having dynamically assignable resource blocks. Variations and modifications of the embodiments disclosed herein, may be made based on the description set forth herein, without departing from the scope and spirit of the disclosure as set forth in the following claims.

What is claimed is:

1. A method of operating a wireless communications system comprising:
   generating first beamforming weights and second beamforming weights based on a first Signal-to-Interference-plus-Noise-Ratio (SINR) indicator received from first user equipment and a second SINR indicator received from second user equipment;
   transmitting first data in a first beam of electromagnetic signals focused on the first user equipment and generated by a first antenna array, the first data being associated with the first user equipment and the first data being transmitted using a first orthogonal frequency division multiple access (OFDMA) resource block of a time slot of a radio frame and the first beamforming weights; and
   transmitting second data in a second beam of electromagnetic signals focused on the second user equipment and generated by the first antenna array, the second user equipment being spatially diverse from the first user equipment, the second data being associated with the second user equipment and the second data being transmitted using the first OFDMA resource block of the time slot of the radio frame and the second beamforming weights.

2. The method, as recited in claim 1, further comprising: scheduling the first user equipment to the first OFDMA resource block and the second user equipment to the first OFDMA resource block based on the first SINR indicator and the second SINR indicator.

3. The method, as recited in claim 1, further comprising: selecting a first modulation type of the first data and a second modulation type of the second data based on the first SINR indicator and the second SINR indicator.

4. The method, as recited in claim 1, further comprising: transmitting third data in a third beam of electromagnetic signals generated by a second antenna array, the third data being associated with a third user equipment and the third data being transmitted using a second OFDMA resource block of the radio frame; and
   transmitting fourth data in a fourth beam of electromagnetic signals generated by the second antenna array, the fourth data being associated with the third user equipment and the fourth data being transmitted using a third OFDMA resource block of the radio frame.

5. The method, as recited in claim 1, wherein the first OFDMA resource block includes a plurality of resource elements, each resource element being defined by a frequency subcarrier of a first frequency band and a symbol index of a time slot of the radio frame.

6. The method, as recited in claim 1, further comprising:
   receiving, by the first user equipment, the first data in the first OFDMA resource block of the first beam; and
   receiving, by the second user equipment, the second data in the first OFDMA resource block of the second beam.

7. An apparatus comprising:
   a precoder configured to generate a first signal based on first beamforming weights and first data associated with a first user equipment and configured to generate a second signal based on second beamforming weights and second data associated with a second user equipment, the second user equipment being spatially diverse from the first user equipment; and
   a resource mapper configured to map the first signal to a first orthogonal frequency division multiple access (OFDMA) resource block of a time slot of a radio frame and configured to map the second signal to the first OFDMA resource block of the time slot of the radio frame; and
   a transmitter configured to transmit the first signal in a first beam of electromagnetic signals using a first antenna array and first beamforming weights and configured to transmit the second signal in a second beam of electromagnetic signals using the first antenna array and second beamforming weights.

8. The apparatus, as recited in claim 7, further comprising:
   a processor configured to schedule the first user equipment to the first OFDMA resource block and the second user equipment to the first OFDMA resource block based on a first Signal-to-Interference-plus-Noise-Ratio (SINR) indicator received from the first user equipment and a second SINR indicator received from the second user equipment.

9. The apparatus, as recited in claim 7, further comprising:
   a processor configured to select a first modulation type of the first data and a second modulation type of the second data based on a first Signal-to-Interference-plus-Noise-Ratio (SINR) indicator received from the first user equipment and a second SINR indicator received from the second user equipment.

10. The apparatus, as recited in claim 7, further comprising:
    a processor configured to generate the first beamforming weights for the first beam and the second beamforming weights for the second beam based on a first Signal-to-Interference-plus-Noise-Ratio (SINR) indicator received from the first user equipment and a second SINR indicator received from the second user equipment.

11. The apparatus, as recited in claim 7, further comprising:
    a plurality of antennas configured for Multiple Input/Multiple Output (MIMO) operation, wherein the plurality of antennas comprises:

the first antenna array, individual antennas of the first antenna array configured to form the first and second beams in a first frequency band; and a second antenna array, individual antennas of the second antenna array configured to form additional beams of electromagnetic signals in a second frequency band different from the first frequency band.

12. The apparatus, as recited in claim 7, wherein the precoder is further configured to generate a third signal based on third beamforming weights and third data associated with a third user equipment, wherein the resource mapper is further configured to map the third signal to a second OFDMA resource block of the radio frame, and wherein the transmitter is further configured to transmit the third signal in a third beam of electromagnetic signals using a second antenna array.

13. The apparatus, as recited in claim 7, wherein the first OFDMA resource block includes a plurality of resource elements, each resource element being defined by a frequency subcarrier and a symbol index of a time slot of the radio frame.

14. The apparatus, as recited in claim 7, further comprising:

a first receiver associated with the first user equipment, the first receiver being configured to receive the first data in the first OFDMA resource block of the first beam; and a second receiver associated with the second user equipment, the second receiver being configured to receive the second data in the first OFDMA resource block of the second beam.

15. A non-transitory, computer-readable storage medium storing instructions executable on a processor to cause the processor to:

generate a first signal based on first beamforming weights and first data associated with a first user equipment and configured to generate a second signal based on second beamforming weights and second data associated with a second user equipment, the second user equipment being spatially diverse from the first user equipment; and map the first signal to a first orthogonal frequency division multiple access (OFDMA) resource block of a time slot of a radio frame and configured to map the second signal to the first OFDMA resource block of the time slot of the radio frame.

16. The non-transitory, computer-readable storage medium, as recited in claim 15, further storing instructions executable on the processor to cause the processor to:

schedule the first user equipment to the first OFDMA resource block and the second user equipment to the first OFDMA resource block based on a first Signal-to-Interference-plus-Noise-Ratio (SINR) indicator received from the first user equipment and a second SINR indicator received from the second user equipment.

17. The non-transitory, computer-readable storage medium, as recited in claim 15, further storing instructions executable on the processor to cause the processor to:

select a first modulation type of the first data and a second modulation type of the second data based on a first Signal-to-Interference-plus-Noise-Ratio (SINR) indicator received from the first user equipment and a second SINR indicator received from the second user equipment.

18. The non-transitory, computer-readable storage medium, as recited in claim 15, further storing instructions executable on the processor to cause the processor to:

generate the first beamforming weights and the second beamforming weights based on a first Signal-to-Interference-plus-Noise-Ratio (SINR) indicator received from the first user equipment and a second SINR indicator received from the second user equipment.

19. The non-transitory, computer-readable storage medium, as recited in claim 15, wherein the first OFDMA resource block includes a plurality of resource elements, each resource element being defined by a frequency subcarrier of a first frequency band and a symbol index of a time slot of the radio frame.

* * * * *